(12) United States Patent
Rottmann

(10) Patent No.: US 10,967,241 B2
(45) Date of Patent: Apr. 6, 2021

(54) GOLF MATCH CREATION AND TRACKING

(71) Applicant: FabForeDev Inc., Tappan, NY (US)

(72) Inventor: Martin Rottmann, Tappan, NY (US)

(73) Assignee: FabForeDev Inc., Tappan, NY (US)

( * ) Notice: Subject to any disclaimer, the term of this patent is extended or adjusted under 35 U.S.C. 154(b) by 0 days.

(21) Appl. No.: 16/523,039

(22) Filed: Jul. 26, 2019

(65) Prior Publication Data
US 2020/0030682 A1    Jan. 30, 2020

Related U.S. Application Data

(60) Provisional application No. 62/711,819, filed on Jul. 30, 2018.

(51) Int. Cl.
| A63B 71/06 | (2006.01) |
| G06F 3/0484 | (2013.01) |
| G06F 3/0482 | (2013.01) |
| A63B 102/32 | (2015.01) |

(52) U.S. Cl.
CPC ...... *A63B 71/0616* (2013.01); *A63B 71/0669* (2013.01); *G06F 3/0482* (2013.01); *G06F 3/04847* (2013.01); *A63B 2071/0694* (2013.01); *A63B 2102/32* (2015.10)

(58) Field of Classification Search
None
See application file for complete search history.

(56) References Cited

U.S. PATENT DOCUMENTS

| 9,925,433 | B2 * | 3/2018 | Boggs | A63B 60/16 |
| 2013/0234842 | A1 * | 9/2013 | Leitz | G06Q 10/10 340/323 R |
| 2014/0114451 | A1 * | 4/2014 | Kerr | G06F 7/08 700/91 |
| 2015/0072796 | A1 * | 3/2015 | Foley | A63B 71/0616 473/153 |

* cited by examiner

*Primary Examiner* — Ronald Laneau
(74) *Attorney, Agent, or Firm* — Lowenstein Sandler LLP

(57) ABSTRACT

A match creation and management method and system are described, according to various implementations. In an implementation, a match is customized based on match information in response to a first selection from a user device. In response to a second selection from the user device, a match profile is configured associated with a plurality of players. For each of the plurality of players, a golf handicap index may be retrieved (e.g., from a third party source), where the golf handicap index is associated with each of the plurality of players. The golf handicap index may then be used at least in part to calculate a course handicap associated with each of the plurality of players. The course handicap may be used to allocate a plurality of stroke holes for each of the plurality of players. An electronic match scorecard may be generated comprising at least in part a plurality of scores associated with the plurality of players and the match information, wherein the electronic match scorecard is displayed within a first interface of the user device.

19 Claims, 10 Drawing Sheets

FIG. 7

Rockland Country Club
Thu Jun 14, 2018
Blue Tees
7 Ways

Alternate Teams

Daout/Steve vs Ken/Marty
Front 9  EVEN
Back 9  EVEN
Overall  EVEN
 Junk  Ken/Marty Win 3-2

Daout/Marty vs Ken/Steve
Front 9  Ken/Steve Win 3/1
Back 9  Daout/Marty Win 1/1
Overall  Ken/Steve Win 2 UP
 Junk  Daout/Marty Win 4-1

Alternate Indies

Daout vs Ken
Front 9  Ken Wins 2/0
Back 9  Ken Wins 2 UP
Overall  Ken Wins 3 & 1

Steve vs Marty
Front 9  EVEN
Back 9  Marty Wins 2/0
Overall  Marty Wins 3 & 1

FIG. 8

Rockland Country Club
Sun Jul 16, 2017
Black Tees
7 Ways 10s/5s

Andrew/Al vs Todd/Marty
Todd/Marty Win 7 Ways +70
   Front 9   0   EVEN
   Back 9   +5   7wB 2/0/2
   Overall   +3   2 UP
   Junk   -1   7-5

Andrew vs Todd
Todd Wins 6 Ways +30
   Front 9   -3   3/1
   Back 9   +6   2xB 4/2/0
   Overall   +3   1 UP Al vs Todd
Al Wins 7 Ways +35
   Front 9   +2   1 UP
   Back 9   +2   2xB 1/1
   Overall   +3   3 & 1

Andrew vs Marty
Marty Wins 10 Ways +50
   Front 9   -3   3/1
   Back 9   +10   2xB 8/6/4/2/0 4wA
   Overall   +3   4 & 2

Al vs Marty
Al Wins 12 Ways +60
   Front 9   +3   4/2/0
   Back 9   +6   2xB 3/1
   Overall   +3   5 & 4

GOLF MATCH CREATION AND TRACKING

CROSS-REFERENCE TO RELATED APPLICATION

This application claims priority to U.S. Provisional Application No. 62/711,819, filed Jul. 30, 2018 and titled "Golf Match Creation and Tracking", the entirety of which is incorporated herein by reference.

TECHNICAL FIELD

The present disclosure relates generally to systems and methods for creating, tracking, managing, and storing activities associated with a golf match via a graphical user interface.

BACKGROUND

Golf is an increasingly popular sport engaged in by thousands of players across the globe. In many instances, tracking of various information associated with a golf match is performed. For example, the participants in a golf match may wish to collect, document, and maintain a record of information relating to a particular golf match, such as course information, tee information, player information, score information, etc. Conventionally, golfers used paper scorecards to manually write in player names, calculate handicaps, allocate strokes, record scores, update matches, tabulate results, and conduct any reconciliation associated with the match. The use of written scorecards for golf match tracking resulted in a time-consuming, inefficient, and inaccurate approach. Furthermore, conventional electronic solutions relating to match tracking suffer from usability issues and a lack of features.

DESCRIPTION OF THE FIGURES

The present disclosure will be understood more fully from the detailed description given below and from the accompanying drawings of various implementations of the disclosure.

FIG. 7 illustrates an exemplary screenshot of an alternative pairings match report generated by the match management module, according to embodiments of the present disclosure.

FIG. 8 illustrates an exemplary screenshot of a match summary report generated by a match management module, according to embodiments of the present disclosure.

DETAILED DESCRIPTION

The present application relates to systems and methods for creating, tracking, managing, and storing activities associated with one or more golf matches (herein referred to as the "match tracking system"). The match tracking system may include a software component (e.g., a set of instructions residing in a memory) executable by one or more processing devices to perform the various features, operations, steps, actions, and activities described in detail herein. In one embodiment, the match tracking system may be implemented using one or more computing devices (e.g., servers) operatively coupled via a network to one or more user devices including a graphical user interface (GUI) configured for interaction with the match tracking system. In one embodiment, the match tracking system may be implemented in part, as an application of a set of instructions executable via the user device to operatively couple the user device with one or more components of the match tracking system.

In one example, the user device may download and store one or more software components of the match tracking system (e.g., a download and installed application) to enable a user to interact (e.g., provide one or more inputs and receive one or more outputs) with the match tracking system via a suitable network communications platform. In one example, the user device may interact with the match tracking system via a graphical user interface configured to access the match tracking system via an electronic browser or via the installed user device-side application. It is to be appreciated that the various functionalities associated with the match tracking system may be performed by instructions executed by the user device, one or more computing devices hosting the match tracking system, or a combination thereof.

The match tracking system can be hosted on one or more computing devices. The computing devices can include for example, and are not limited to, any data processing device, such as a desktop computer, a laptop computer, a mainframe computer, a personal digital assistant, a server computer, a handheld device or any other device configured to process data.

The one or more user devices described herein may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader, wearable electronic devices and the like. For example, a user device may be a laptop computer, a tablet computer or a smartphone.

Figure 1:
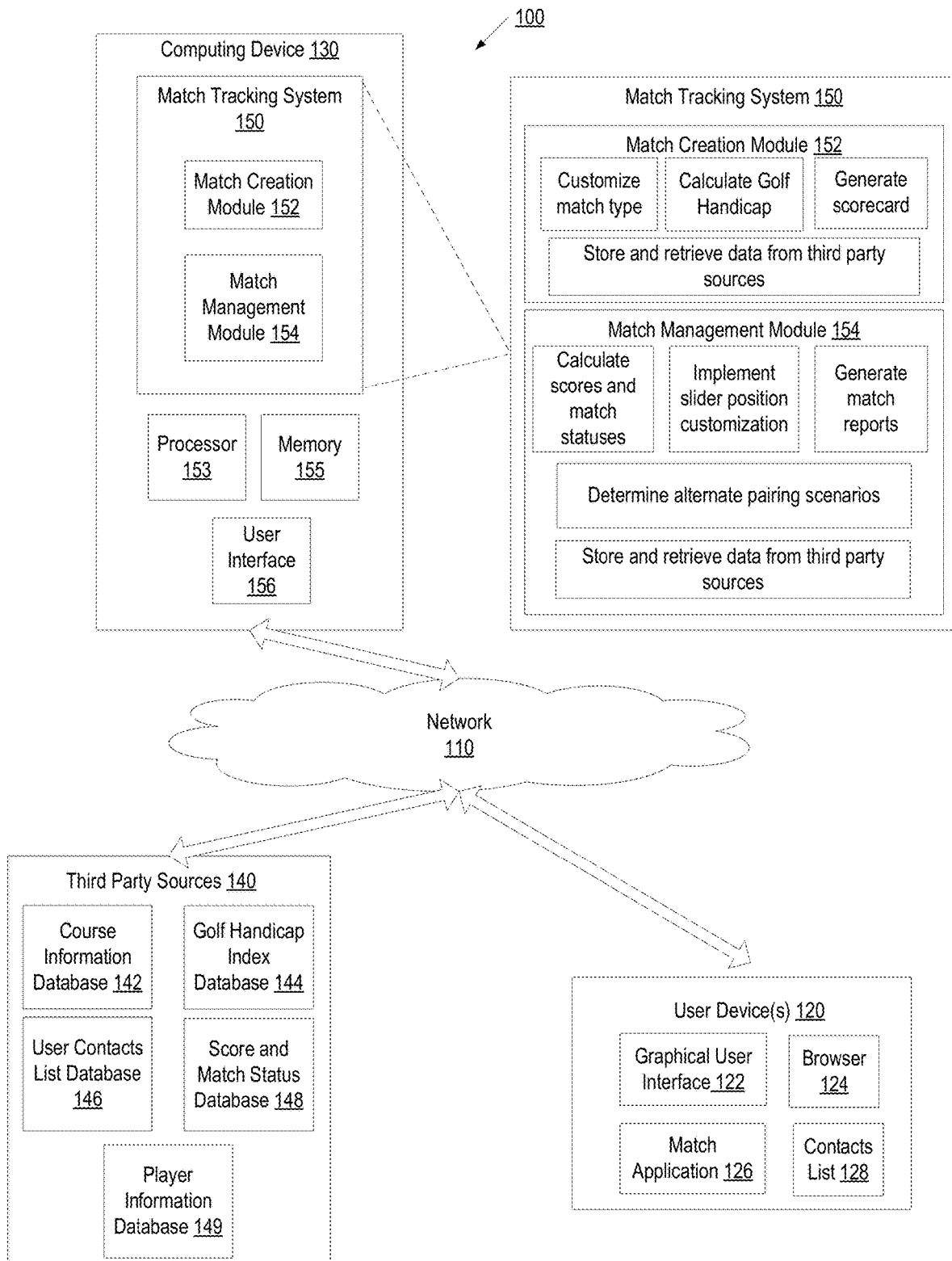
FIG. 1 is a block diagram illustrating an exemplary environment to support a match tracking system, according to embodiments of the present disclosure.

FIG. 1 is a block diagram illustrating an exemplary environment 100 in which examples of the present disclosure can be implemented. The exemplary environment 100 can include one or more computing devices 130, one or more user devices 120, and one or more third party sources 140 coupled to each other over one or more networks 110. In one embodiment, a suitable network may include, for example, the Internet, intranets, extranets, wide area networks (WANs), local area networks (LANs), wired networks, wireless networks, other suitable networks, or any combination of two or more such networks.

In one embodiment, the exemplary environment 100 includes a match tracking system 150 executing on a computing device 130, according to an embodiment. In one embodiment, the match tracking system 150 is configured to operatively couple with an application or stored and executed by the one or more user devices 120, also referred to as a "match application" 126. In one embodiment, the match tracking system 150 may be a program, application, or client residing on the user device 120 (e.g., the match application 126) that is communicatively coupled via the network 110 to a corresponding match tracking system 150 executing on a remote computing device (e.g., computing device 130). In one embodiment, the computing device 130 may execute one or more programs based on instructions stored in memory or in another suitable data store. For example, the match tracking system 150 may include a program or set of instructions stored in a memory 155 and executable by the processor 153 of the computing device 130 to perform operations to manage a golf match via an interface 122 of the user device 120. In an embodiment, the computing device 130 may include a user interface 156 to enable a system user to access the match tracking system 150.

In one embodiment, the match tracking system 150 may include a match creation module 152 and a match management module 154. In one embodiment, the match creation module 152 and the match management module 154 are configured to enable a user (e.g., a golf player) to create or establish a new golf match for purposes of tracking and storing associated match information (e.g., course information, player information, scores, results, etc.).

The match creation module 152 may be configured to enable a user to customize a match type, calculate golf handicaps for each player/user, generate a match scorecard, store and retrieve data from third party sources, etc. In one embodiment, a user can customize a match type based on course information stored, for example, in a course information database 142. In one embodiment, the match creation module 152 may store and retrieve data associated with the players in a player information database 149. In one embodiment, the match creation module 152 may store and retrieve data for calculating a golf handicap associated with the multiple players identified in connection with a match. In an embodiment, information to be used for calculating the golf handicaps can be stored in a golf handicap index database 144. In one embodiment, the match tracking module 152 may retrieve data for selecting players for a match from a user contacts list database 146. In one embodiment, the match tracking module 152 is configured to enable a user to connect to a contacts list 128, wherein the contacts list 128 may be a list of contacts stored on the user's device 120 or stored in the user contacts list database 146. The match creation module 152 may store and retrieve data from one or more third party sources at any time.

The match management module 154 may be configured to calculate scores and match statuses, customize a slider (or other interactive element of the interface 122 generated on the user device 120), generate match reports, determine alternative pairing scenarios, store and retrieve data from third party sources, etc., as described in greater detail below. In one embodiment, data used to calculate scores and match statuses can be stored in and retrieved from a score and match status database 148. In one embodiment, the match management module 154 may store and retrieve data for implementing a slider position customization and determining alternative pairing scenarios in the player information database 149. The match management module 154 may store and retrieve data from one or more third party sources at any time.

Figure 2:
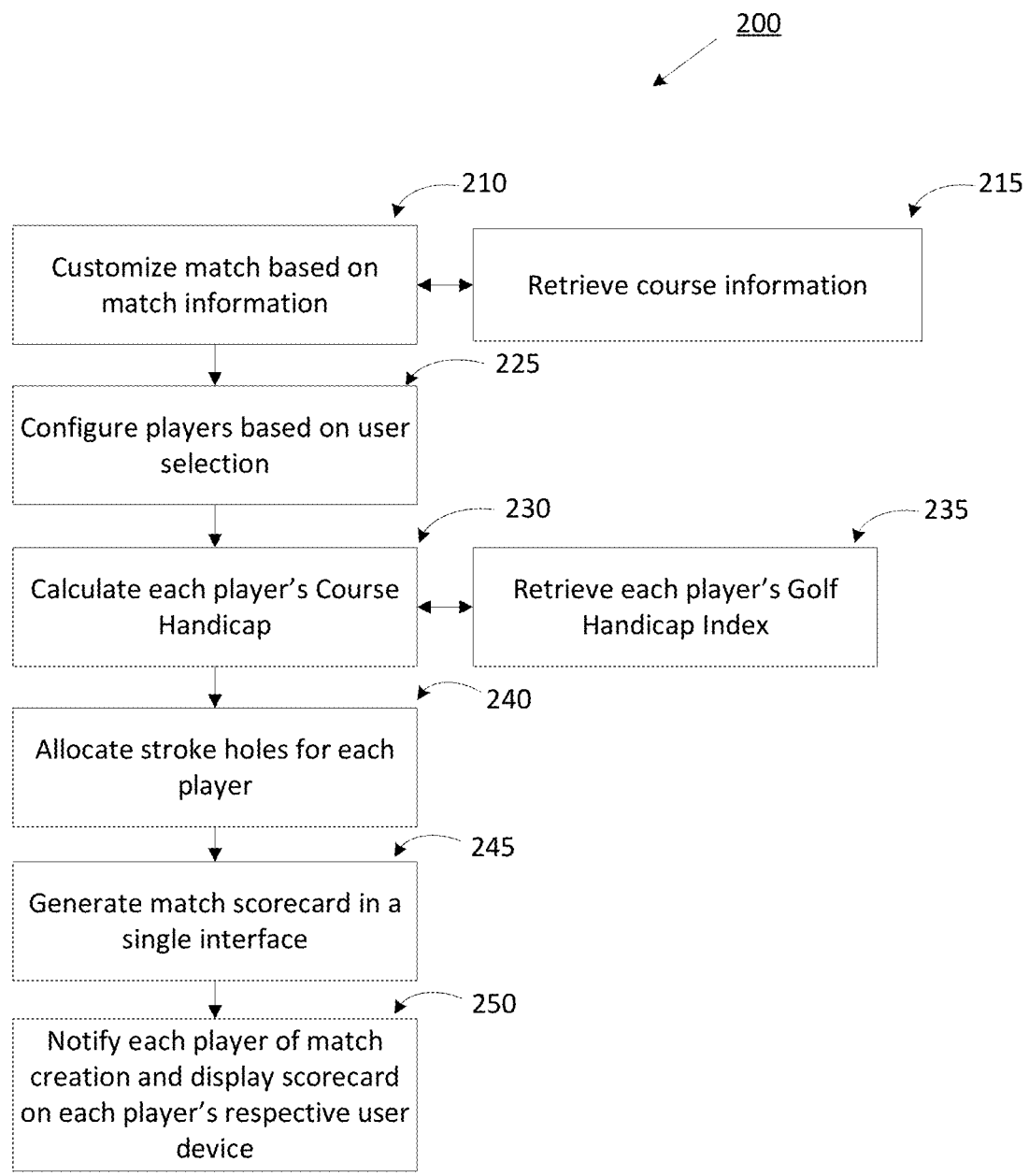
FIG. 2 is a flow diagram illustrating an example match creation process executed by a match creation module, according to embodiments of the present disclosure.

FIG. 2 is a flow diagram illustrating an example match creation process 200 executed by a processing device (e.g., processor 153 of FIG. 1), according to embodiments of the present disclosure. The match creation process 200 may be performed by a match creation module (e.g., match creation module 152 of FIG. 1) of a match tracking system (e.g., the match tracking system 150 of FIG. 1) executed by a computing device (e.g., computing device 130 described with reference to FIG. 1). In one embodiment, the match creation process 200 may be initiated by a user device launching or starting a program or an application (e.g., the match application 126) via the user device 120. In one embodiment, the match creation process 200 may be initiated by a user via a GUI (e.g., interface 122 of FIG. 1) configured to access and interoperate with the match tracking system 150.

In block 210, the processing device customizes a match based on match information. Match information may include, for example, different types of golf games, courses/tees, and stakes. In block 215, the processing device utilizes user-defined default values to customize the match, according to one embodiment. The user-defined default values may be stored in a third party source (e.g., the course information database 142 described in reference to FIG. 1). In one embodiment, the processing device of the match tracking system 150 retrieves course information from the course information database 142 to customize the match. In one embodiment, the processing device generates a GUI via a user device to collect one or more inputs associated with the creation of golf matches on an electronic platform. The user input relating to an interactive portion of the GUI (e.g., an icon, button, field, etc.) labeled "Create Match" invokes a Create Match screen which loads with user-defined default values for match type, course/tee, and stakes. In one embodiment, the match tracking system 150 is configured to receive one or more inputs from a user device to select values for one or more parameters associated with a match.

In one embodiment, the processing logic may set one or more default values associated with a match, as described herein. In one embodiment, the match tracking system 150 has the ability to set a default game on a per user basis so that the next time a "Create Match" feature is invoked, that game automatically loads (i.e., without user interaction to cause the selection). In one example, a user may swipe left and tap "Set as Default" on a "Games" list entry to set that game as their default game type. In one embodiment, the match tracking system 150 stores the default value.

In one embodiment, the match tracking system 150 may set a default course/tee from a favorites list so that the next time "Create Match" is invoked, that corresponding course/tee information automatically loads. In an embodiment, a user can select one or more favorite course/tees from a searchable list of courses. The match tracking system 150 stores these values on a per user basis for future reference, according to one embodiment, as part as a customized user profile associated with a particular user.

In one embodiment, the match tracking system 150 may set default match stakes (e.g., a wagering amount or other non-monetary outcome measurement) per user and game type such that a subsequent instance where a "Create Match" feature is invoked, the previously identified match stakes are automatically loaded for the default (or selected) game. For example, default stakes can be saved by a user interacting with a button or other display element on a "Stakes" screen of the GUI. The system stores these values on a per user and game basis for future reference. Users may save different default stake values for different match types.

In block 225, the processing device of the match tracking system 150 configures players based on the user's selection. In one embodiment, the match tracking system 150 provides a GUI via a user device to collect one or more user inputs, where the one or more user inputs relate to an interactive display element or portion of the GUI which enables a user to select additional players for the match. In one embodiment, the match tracking system 150 retrieves information from the user's contacts list and present the list to the user to enable player selection. The user's contacts list may be stored in the user contacts list database 146. In one embodiment, the user's contacts list is stored locally on the user device (e.g., the contacts list 128 of FIG. 1). The user may select the players for the match from the contacts list.

In one embodiment, the match tracking system 150 enables the user who created the match to determine player order in the scorecard and to set "Teams" for the applicable game, as well as a number of player combinations. In one embodiment, this feature is accessible via a "Create Match Teams and Caps" interface and is activated by a user interaction (e.g., a tap/hold/drag operation of a vertical bar to the right of each player's course handicap field).

In one embodiment, the match tracking system 150 is configured to eliminate the use of duplicate names so that a unique name string appears in the scorecard for each player. In one embodiment, players are identified by a character string (e.g., a first name or nickname) in the scorecard. If any or all players in the match have the same name, the match tracking system 150 applies a custom duplicate name algorithm.

In block 230, the match tracking system 150 calculates each player's course handicap. In one embodiment, the match tracking system 150 determines whether each player has a Golf Handicap Index (GHIN #). The handicap index is a measurement of a player's potential ability on a course of standard playing difficulty, according to standards set by the United States Golf Association (USGA), The handicap index can be used to determine the player's handicap at a particular course, based on the difficulty of that course. The match tracking system 150 may search in the golf handicap index database 144 to determine whether a player has a Golf Handicap Index. In block 235, the match tracking system 150 retrieves each player's GHIN # to calculate each player's course handicap, according to one embodiment. In one embodiment, the match tracking system 150 calculates each player's course handicap using one or more handicap formulas. The handicap formula may combine a player's GHIN # with the selected course slope rating to calculate the Course Handicap (e.g., GHIN # multiplied by a slope rating divided by a standard slope rating (e.g., 113) rounded to the nearest whole number). In one embodiment, the match tracking system 150 updates a player's GHIN # periodically (e.g., twice monthly) in accordance with official resets or threshold frequency set in the match tracking system 150. Advantageously, the match creation process is enhanced by the match tracking system 150's storage, maintenance, and application of a player's GHIN # which permits automatic computation of the course handicap when combined with the selected course slope.

In one embodiment, the match tracking system 150 provides a GUI via a user device to collect one or more user input, where a screen loads associated with "Teams and Caps" corresponding to a player's GHIN #. In one embodiment, a user may manually enter course handicap information for one or more players that do not have a stored GHIN # retrievable by the match tracking system 150.

In one embodiment, course handicap information is a key input for determining stroke allocations which allows golfers of varying abilities to equitably compete against one another. Advantageously, creating matches in an efficient manner incentivizes users to utilize the match tracking system 150 as compared to manual match tracking (e.g., with paper and pencil) or other electronic trackers lacking the functionality and user-friendliness described herein. The methods described herein may implement user-defined default values to highlight the streamlined aspect of match creation. In one embodiment, any default value may be modified by the user, such as, for example, selecting a different match type, course/tee, stake values, etc. In one embodiment, the match tracking system 150 receives an input (e.g., a drag and drop) associated with player rows to arrange player order and sides, if the match type supports team competition. The match tracking system 150 receives a user input relating to an interactive portion of the GUI labeled "Done" or a similar action label to return to a Create Match screen that displays player names in order along with course handicaps, according to one embodiment.

In block 240, the match tracking system 150 allocates stroke holes for each player. In one embodiment, the match tracking system 150 is configured to allocate stroke holes across players for both team and individual matches. In one embodiment, the match tracking system 150 identifies player course handicaps and the selected course/tee hole stroke index to calculate stroke allocation. In one embodiment, the match tracking system 150 determines how many strokes each player receives or gives in a particular match. The difference in each player's course handicap determines the number of strokes. Strokes are applied per hole based on the course/tee hole stroke index with the lowest index (1) receiving the first stroke. Further strokes are allocated based on an algorithm dependent on a selected game type along with the manner in which the course/tee stroke index is implemented. For example: if one stroke is allocated, put it on the #1 handicap hole; if both 9's have a #1 handicap hole, put it on the front 9; allocate an even number of strokes equally across front and back 9 according to their respective front/back handicap value; allocate an odd number of strokes the same way (respective handicap value) and give the extra stroke on the front 9 (e.g., 3 strokes is 2 front 1 back, 5 strokes is 3 front 2 back, etc.). It is noted that the above-described method may change based on the match type selected.

Figure 5:
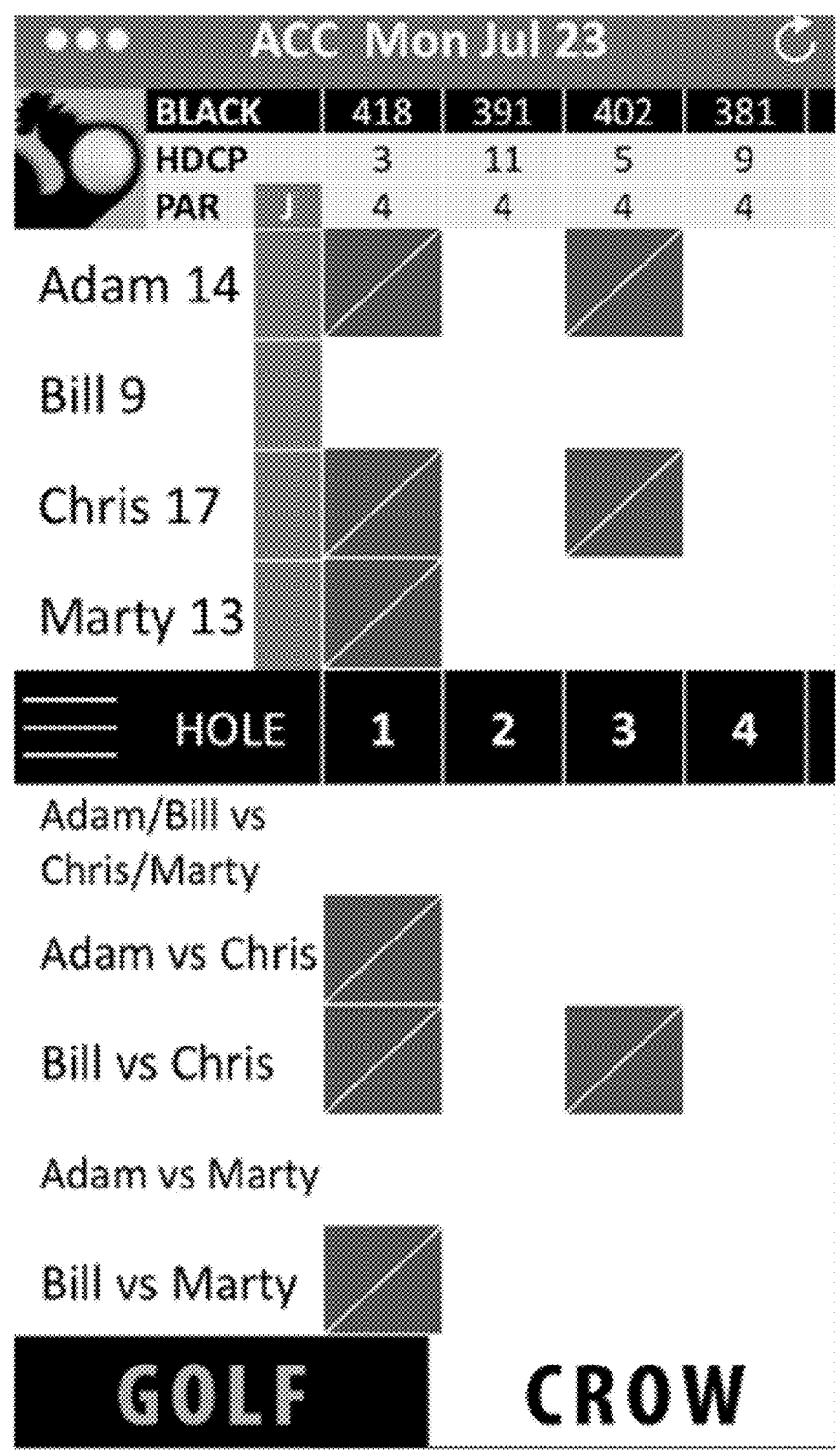
FIG. 5 illustrates an exemplary screenshot of an electronic scorecard with integrated match tracking and management in a single interface, according to embodiments of the present disclosure.

In block 245, the match tracking system 150 generates an electronic match scorecard displayed within a single interface. FIG. 5 illustrates an exemplary screenshot of an electronic scorecard with integrated match tracking and management displayed in a single interface, according to embodiments of the present disclosure. In one embodiment, the match tracking system 150 may receive a user input relating to an interactive portion of the GUI labeled "Done" or a similar action label to create the match and present the match scorecard with integrated match tracking and stroke allocations per player and match. In one embodiment, the match tracking system 150 creates a number of rows in the scorecard based on match type and number of players for team and indie matches. In one embodiment, one row per player is created above the hole button row to capture scores, and a dynamic number of rows are created below the hole button row to track the matches inferred by the match type and number of players.

In one embodiment, the scorecard contains rows for each player and match and columns for each hole. Stroke holes are identified for each player and match combination at the time of match creation. Based on inputted gross scores and specific match type controls, the match tracking system 150 tracks each match and determines each player's consideration (e.g., wins and losses) at the end of the match. In one embodiment, the scorecard is viewable in both portrait and landscape mode, automatically orienting itself to device position. In one embodiment, stroke hole for each player and match are plainly identified at the time of match creation. In one embodiment, the scorecard contains a toggle that flips the match section display between match hole score and press score or cumulative score based on match type. Score values are color/shape coded and may be adjusted for equitable stroke control purposes with scores so adjustments are visually noted (e.g., appended with "x"), as described in more detail further below.

In one embodiment, match score values are presented from each participant's perspective and are signed and color coded for ease of reference. The match management module 154 may be configured to receive gross scores and apply game specific logic to determine match or points-based hole outcomes across both team and individual matches for the selected game type. In an example, "Press" score values are also calculated and displayed via a press string viewable with the match section display toggle. For select game types, the match tracking system may double the back 9 stakes including press values across both team and individual matches.

In one embodiment, for select game types, the match tracking system 150 has the ability to generate and manage final hole ("Aloha") sub-matches and automatically consolidate results with respective primary team and individual matches. The Aloha feature of the match tracking system 150 is described in greater detail below.

In one embodiment, the scorecard generated by the match tracking system 150 maintains a "Junk" column per player, indicating exceptional scoring events both automatic and manual. The "Junk" feature of the match tracking system 150 is described in greater detail below. For certain match types, at user discretion, the match tracking system 150 maintains a separate junk match and automatically consolidates results with team match results.

In block 250, the match tracking system 150 notifies each player of the match creation. In one embodiment, the match tracking system 150 enables each user to view the match from their perspective on their respective user device (same for team, opposite for opponents). In one embodiment, a "Gallery" feature further allows match participants to share the match with anyone in their contacts. In one embodiment, a "Buddy" feature allows the designation of selected contacts as "Gallery" members for a user's match.

Figure 3:
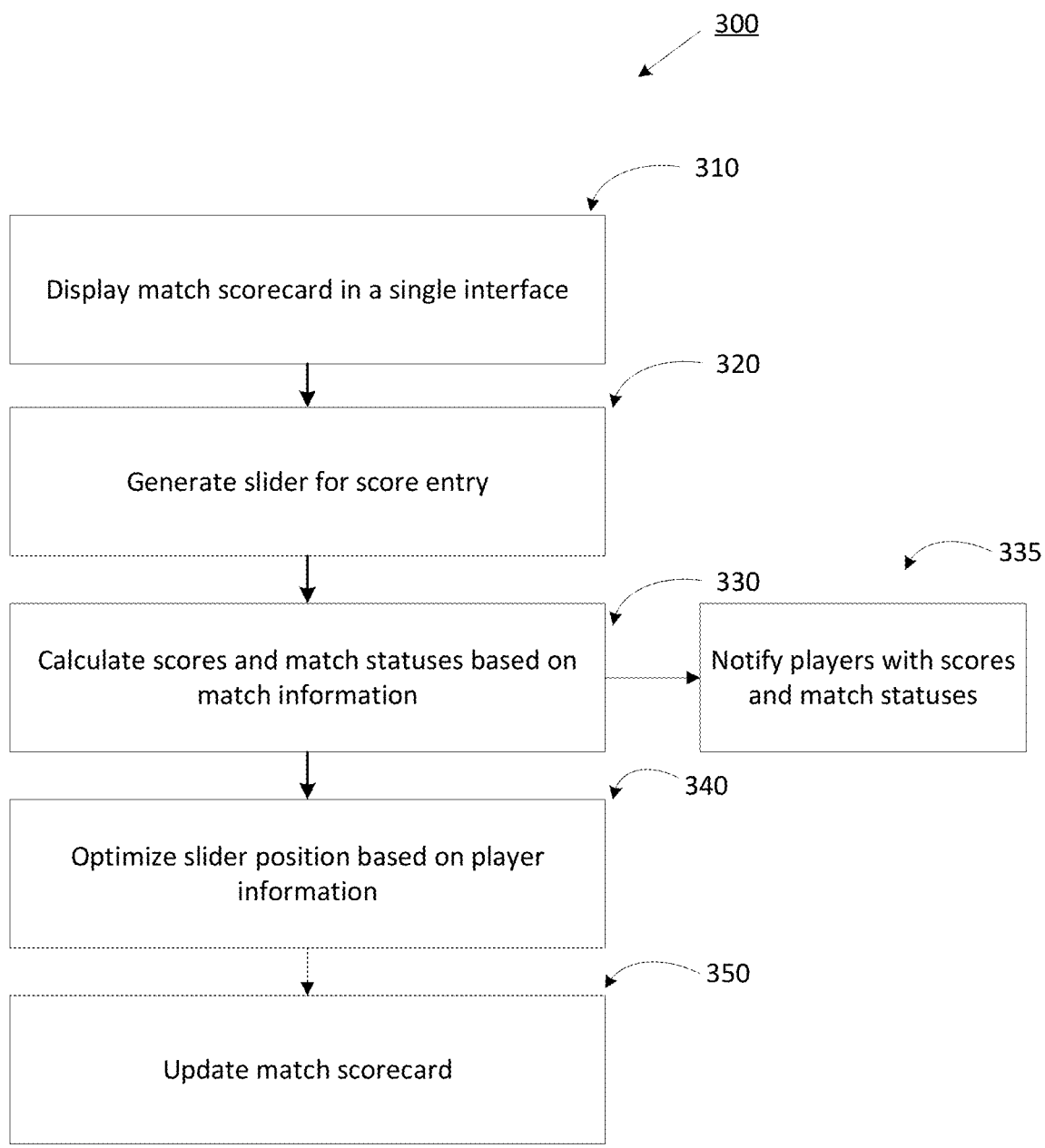
FIG. 3 is a flow diagram illustrating an example score entry process executed by a match management module, according to embodiments of the present disclosure.

FIG. 3 is a flow diagram illustrating an example score entry process 300 executed by a processing device of a match tracking system, according to embodiments of the present disclosure. In an embodiment, the score entry process 300 may be performed by a match management module (e.g., match management module 154 of FIG. 1) of a match tracking system (e.g., the match tracking system 150 of FIG. 1) executed by a processing device of a computing device (e.g., computing device 130 described with reference to FIG. 1). In one embodiment, the score entry process 300 may be initiated by a user launching or starting the match application 126 via the user device 120. In one embodiment, the score entry process 300 may be executed after the match creation process 200 is executed, or the score entry process 300 and the match creation process 200 may be running concurrently.

Figure 6A:
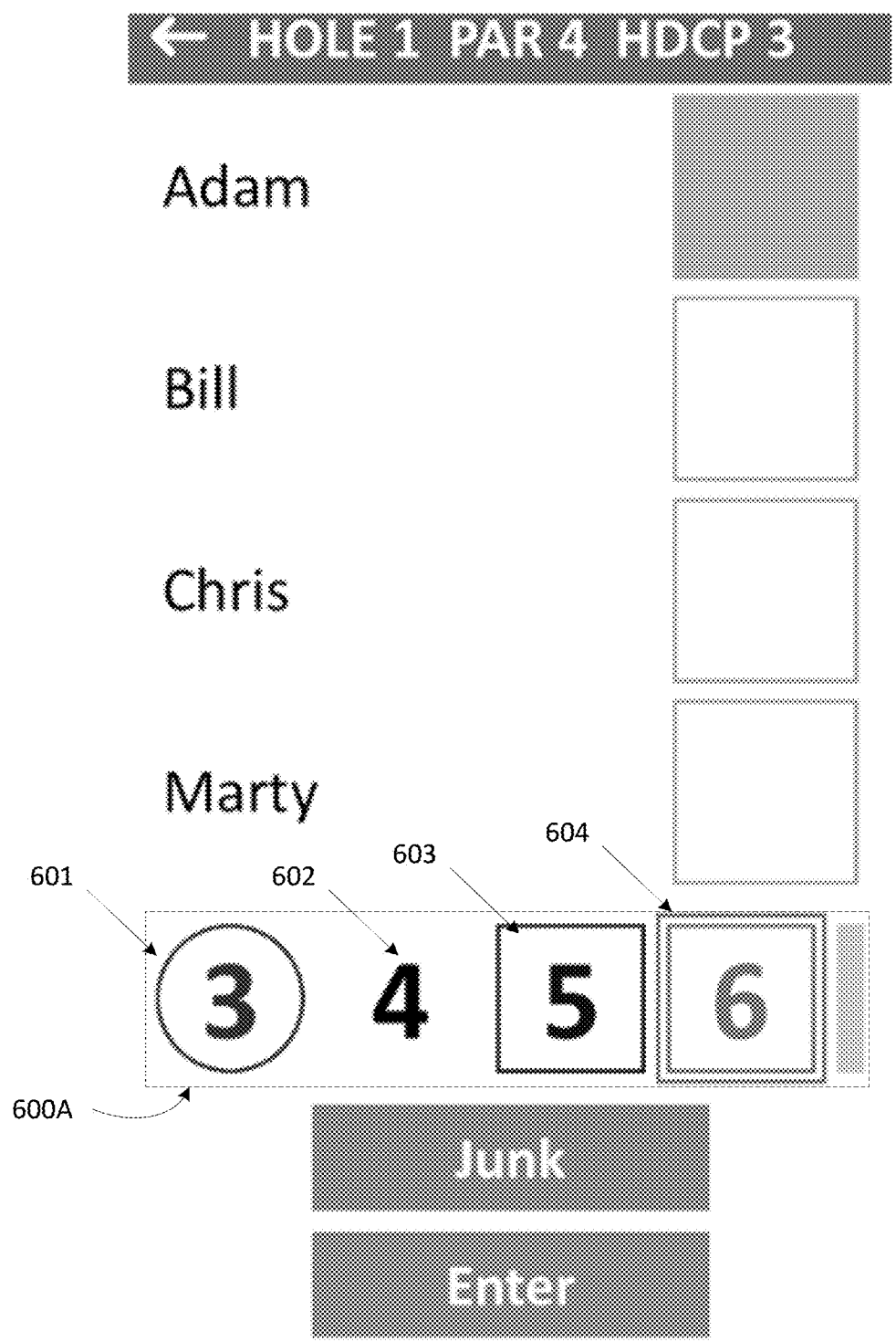
FIGS. 6A-6B illustrate exemplary screenshots of an example score entry process within a single interface including a customized slider portion, according to embodiments of the present disclosure.
Figure 6B:
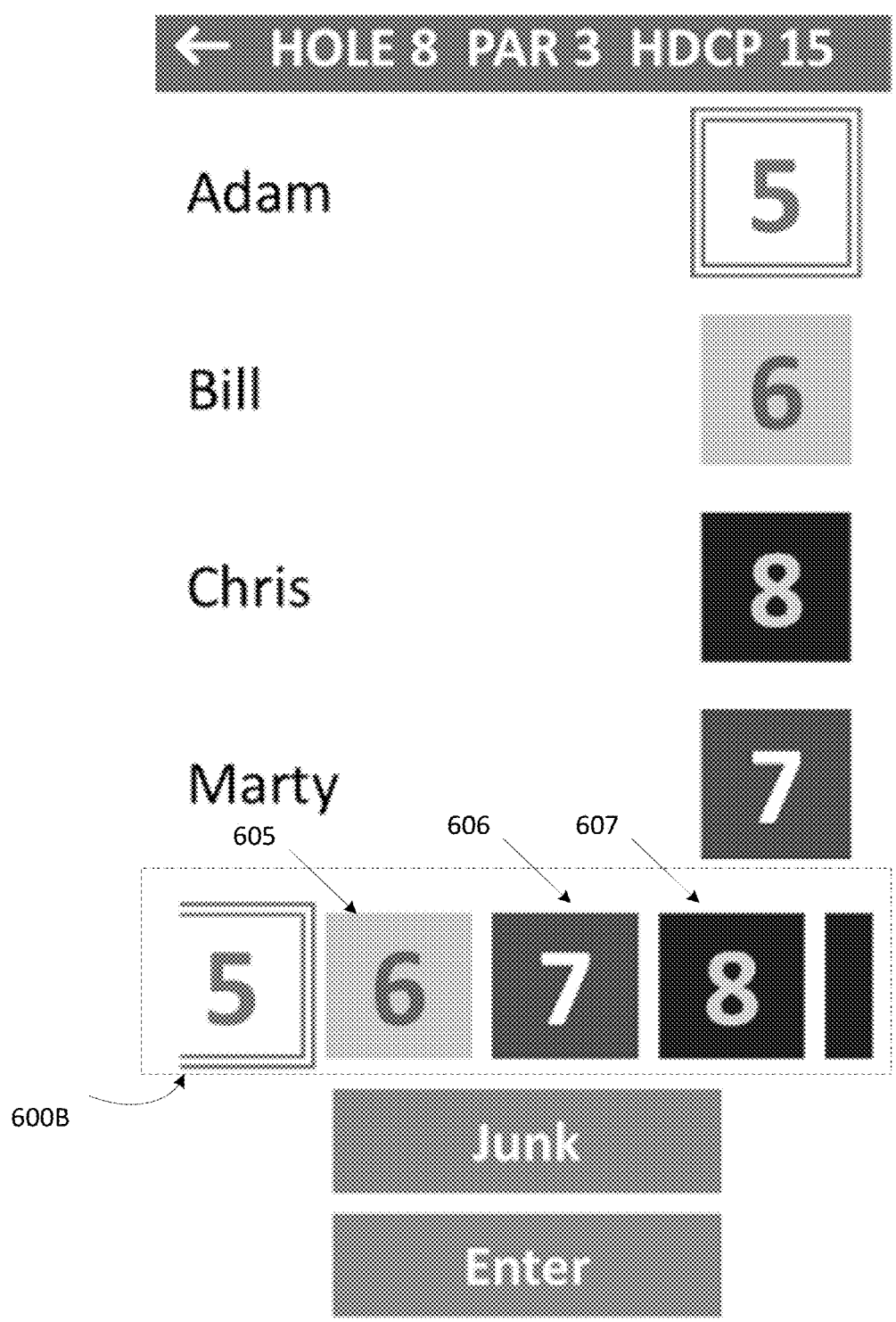

In one embodiment, the match tracking system is configured to enable minimal user interactions and inputs (e.g., taps) for simultaneous hole score entry across multiple players (e.g., two to five players). In one embodiment, the match tracking system displays a slider or other interactive section of the user interface. In one embodiment, the match tracking system implements slider position customization (e.g., slider position optimization) based on hole par value and automatic tabbing to the next score field. Capturing scores in as efficient a manner as possible is advantageous in that it incentivizes users to use the match tracking system during match play. FIGS. 6A-6B illustrate exemplary screenshots of an example score entry process using a slider in a single interface, according to embodiments of the present disclosure.

In block 310, the processing device displays the match scorecard in a single interface, as illustrated by FIG. 5. In one embodiment, the match tracking system 150 displays the match scorecard across each player's respective user device. In block 320, the match tracking system 150 generates a slider for score entry and then displays it within the single interface. In one embodiment, the match tracking system 150 receives a user input relating to an interactive portion of the GUI to select a hole number in the scorecard displayed via the user interface to render a hole score entry screen or interface. The match tracking system 150 receives a user input relating to an interactive portion of the GUI to select a score value in the slider once for each player (e.g., four inputs or taps for four years). The match tracking system 150 receives a user input relating to an interactive portion of the GUI to enter the input (e.g., by selecting or tapping an "Enter" button). The match tracking system 150 records the scores and automatically updates the one or more scorecards across each player's respective user device.

In one embodiment, given hole par value, the match tracking system 150 presents color and shape coded symbols to designate score value relative to par and automatically annotates scores better than par (e.g., A, DE, E, B), according to the below example graphical identifiers.

- Ace (score of 1)—e.g., a red number inside red circle filled with yellow or the character "A" (not shown);
- Double Eagle (e.g., score of 1 on par 4, 2 on par 5)—e.g. a red number inside red circle filled with yellow or the character string "DE" (not shown);
- Eagle (e.g., score of 2 on par 4, 3 on par 5)—red number inside two red circles or the character "E" (not shown);
- Birdie (e.g., score of 2 on par 3, 3, on par 4, 4 on par 5)—red number inside red circle (e.g., the number "3" 601 in FIG. 6A);
- Par (e.g., score of 3 on par 3, 4 on par 4, 5 on par 5)—plain black number (e.g., the number "4" 602 in FIG. 6A);
- Bogey (e.g., score of 4 on par 3, 5 on par 4, 6 on par 5)—blue number inside blue square (e.g., the number "5" 603 in FIG. 6A);
- Double Bogey (e.g., score of 5 on par 3, 6 on par 4, 7 on par 5)—gray number inside 2 gray squares (e.g., the number "6" 604 in FIG. 6A);
- Triple Bogey (e.g., score of 6 on par 3, 7 on par 4, 8 on par 5)—brown number inside gray filled square (e.g., the number "6" 605 in FIG. 6B);
- Quadruple Bogey (e.g., score of 7 on par 3, 8 on par 4, 9 on par 5)—white number inside dark gray filled square (e.g., the number "7" 606 in FIG. 6B); and >Quadruple Bogey (e.g., score >7 on par 3, >8 on par 4, >9 on par 5)—light blue number inside purple filled square (e.g., the number "8" 607 in FIG. 6B).

In block 330, the match tracking system 150 calculates scores and match statuses based on match information. In one embodiment, match information may be stored in a third party source (e.g., the score and match status database 148). In block 335, the match tracking system 150 notifies players with scores and match statuses. The match tracking system 150 may notify each player on their respective user devices or on one user device, according to various embodiments.

In block 340, the match tracking system 150 optimizes the slider position based on player information. In one embodiment, the match tracking system 150 optimizes the slider such that the slider displays values or scores most likely to be recorded based on each player's hole par value (e.g., Birdie, Par, Bogey, Double Bogey or Par−1, Par, Par+1, Par+2). In an example, as illustrated by FIG. 6A, for a Par 4, the slider 600A (denoted in FIG. 6A by the dashed portion of the GUI which the user can interact with (e.g., via a touch command) to select a value from the customized values presented by the slider 600A) is customized to display 3, 4, 5, and 6. In another example, as illustrated by FIG. 6B, for a Par 3, the slider 600B is customized to display 5, 6, 7, and 8. In one embodiment, the slider may be dragged right or left to reveal lower or higher score values.

In one embodiment, the match tracking system 150 transitions to a next player in response to the receipt of the entry for the previous player. This enables a user to continue interactions with the slider to complete the score entry process for the particular hole. In one embodiment, the match tracking system 150 receives an indication of user action (e.g., tapping directly in a score field) to place cursor focus there and update an entry. In one embodiment, when a user revisits a previously entered score associated with a completed hole, the "Enter" button label may change to an "Update" button.

In block 350, the match tracking system 150 updates and displays the match scorecard. In one embodiment, the update and display occur in real time across each user's respective user device. Advantageously, this allows a single scorekeeper to automatically maintain and share match statuses across a network by simply entering gross scores per hole. For example, the match creator (e.g., a user setting up the match) may act as scorekeeper, inputting/updating score values. In one embodiment, in view of the inputs, the match tracking system 150 calculates and presents match statuses on a per match, per hole, and aggregate basis for the selected game type. The match tracking system 150 may further share values with match participants and invited gallery members through a notification process. In one embodiment, the match tracking system 150 renders and displays match statuses from each participant perspective on their respective user device.

In one embodiment, the match tracking system 150 is configured to implement Equitable Stroke Control (ESC) adjustments. Equitable Stroke Control (ESC) is the downward adjustment of individual hole scores for handicap purposes in order to make handicaps more representative of a player's potential ability. In one embodiment, ESC sets a maximum number that a player can post on any hole depending on the player's course handicap. In one embodiment, the match tracking system 150 applies Equitable Stroke Control as needed and displays adjusted values in the scorecard. Adjusted score values are appended with an "x" and the hole is catalogued as ESC for downstream reporting purposes.

In one embodiment, the match tracking system 150 is configured to receive and process voice activated entry. In one example process, the match tracking system 150 performs the following steps: 1. Receive an input corresponding to an interaction (e.g., tap) on a hole number in scorecard to present a hole score entry screen; 2. Receive an input corresponding to an interaction (e.g., tap) with a "microphone" button, link, or symbol; 3. Receive an audio input (e.g., spoken words from a user) corresponding to score value for each player as a number (e.g. "three, five, four, four") or a reference relative to par (e.g., "Birdie, Bogey, Par, Par"); 4. Receive an input corresponding to the termination of the score entry input (e.g., a user speaking "Done" or a user tapping an "Enter" button).

Figure 4:
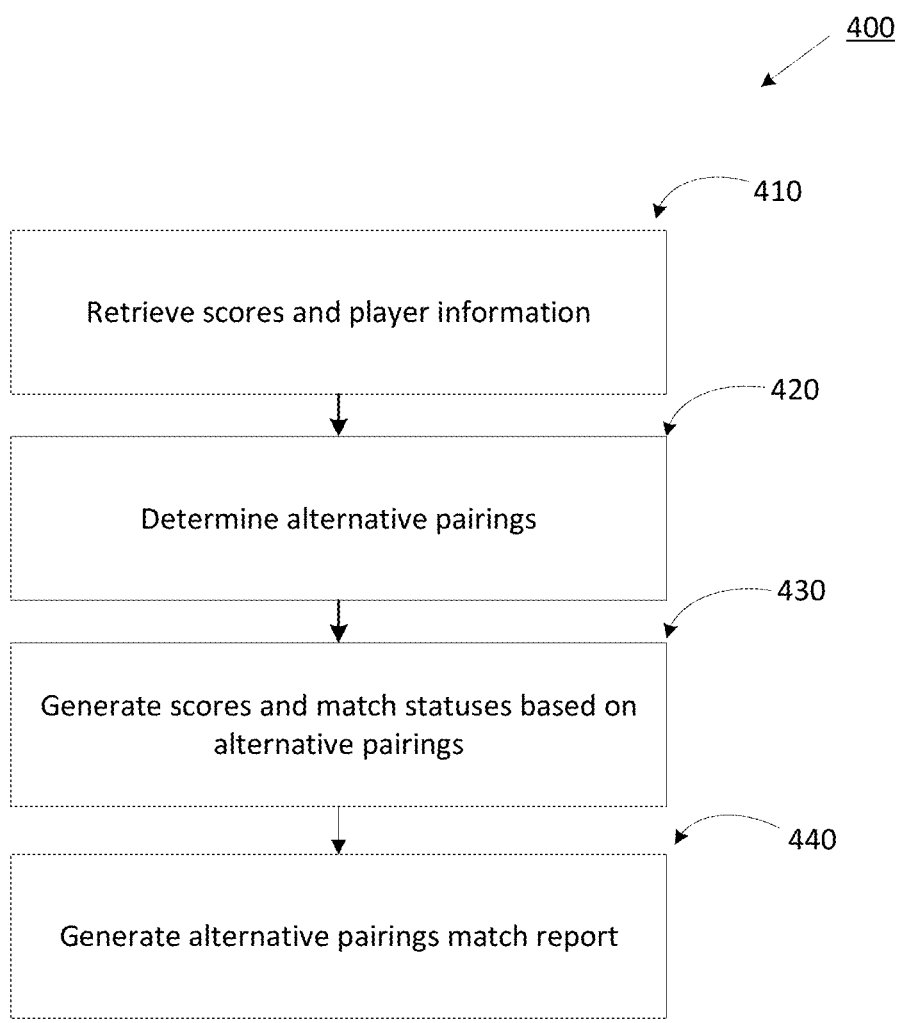
FIG. 4 is a flow diagram illustrating an example alternative pairings generation process executed by a match management module, according to embodiments of the present disclosure.

FIG. 4 is a flow diagram illustrating an example alternative pairings generation process 400 executed by a processing device of a match tracking system (e.g., executable by the match management module 154 of FIG. 1), according to embodiments of the present disclosure. The alternative pairings simulate how the matches would stand if the teams were set up differently and scores were the same and how the match would progress if the users shot the same score but were on different teams. The alternative pairings generation process 400 may be performed by a match system (e.g., the match tracking system 150 of FIG. 1) executed by a computing device (e.g., computing device 130 described with reference to FIG. 1). In one embodiment, the alternative pairings generation process 400 may be initiated by a user launching or starting the match application 126 via the user device 120. In one embodiment, the alternative pairings generation process 400 may be executed after the match creation process 200 and the score entry process 300 are executed, or the alternative pairings generation process 400 may run concurrently with the match creation process 200 and/or the score entry process 300.

In block 410, the processing device of the match tracking system 150 retrieves scores and player information. In one embodiment, the scores may be stored by a third party source (e.g., the score and match status database 148 described in reference to FIG. 1). In one embodiment, the player information may be stored in a third party source (e.g., the player information database 149). The match tracking system 150 retrieves scores and player information from the score and match database 148 and the player information database 149, according to one embodiment.

In block 420, the processing device determines one or more alternative pairings. In one embodiment, the match tracking system 150 creates alternative pairings that simulate how the matches would stand if the teams were set up differently and scores were the same and how the match would progress if the users shot the same score but were on different teams.

In block 430, the match tracking system 150 generates scores and match statuses based on the alternative pairings that the match tracking system 150 determines. In one embodiment, the match tracking system 150 calculates scores and match statuses based on information regarding each user's scores and match statuses after the match tracking system 150 records the first hole scores. The match tracking system 150 may retrieve such information from the one or more third party sources 140, according to one embodiment.

In block 440, the match tracking system 150 generates an alternative pairings match report detailing the scores and match statuses for each user. In one embodiment, the match tracking system 150 notifies each user regarding the alternative pairings match report and shares the report with each user's respective user device. FIG. 7 illustrates an exemplary screenshot of an alternative pairings match report generated by the match management module, according to embodiments of the present disclosure.

Provided herein is an example illustrating the alternative pairings configuration process. Players A, B, C, D have Team match of AB vs CD and individual matches of A vs C, A vs D, B vs C, and B vs D. The alternative pairings feature enables tracking of Team match pairings of AC vs BD and AD vs BC along with individual matches of A vs B and C vs D. The matching system may generate an alternative pairings report which is accessible via the match tracking system upon recording of first hole scores. An example template for the report format may be as follows:

Alternative Pairings
Course - Tee
Day Mon DD, YYYY
Game type

An example of the alternative pairings configuration may be as follows:

| Alternative Teams | A/C vs B/D (Player 1/Player 3 vs Player 2/Player 4) |
| --- | --- |
| Front 9 | EVEN or [Team Ahead] [Lead/Win(if decided)] [Press score] |
| Back 9 | EVEN or [Team Ahead] [Lead/Win(if decided)] [Press score] |
| Overall | EVEN or [Team Ahead] [Lead/Win(if decided)] [Overall score] |
| Junk | EVEN or [Team Ahead] [Lead/Win(if decided)] [Junk score] |

Another example of an alternative pairings may be as follows:

| Alternative Teams | A/D vs B/C (Player 1/Player 4 vs Player 2/Player 3) |
| --- | --- |
| Front 9 | EVEN or [Team Ahead] [Lead/Win(if decided)] [Press score] |
| Back 9 | EVEN or [Team Ahead] [Lead/Win(if decided)] [Press score] |
| Overall | EVEN or [Team Ahead] [Lead/Win(if decided)] [Overall score] |
| Junk | EVEN or [Team Ahead] [Lead/Win(if decided)] [Junk score] |

An example of an alternative indie configuration may be as follows:

| Alternative Indie | A vs B (Player 1 vs Player 2) |
| --- | --- |
| Front 9 | EVEN or [Player Ahead] [Leads/Wins(if decided)] [Press score] |
| Back 9 | EVEN or [Player Ahead] [Leads/Wins(if decided)] [Press score] |
| Overall | EVEN or [Player Ahead] [Leads/Wins(if decided)] [Overall score] |

Another example of an alternative indie configuration may be as follows:

| Alternative Indie | C vs D (Player 3 vs Player 4) |
| --- | --- |
| Front 9 | EVEN or [Player Ahead] [Leads/Wins(if decided)] [Press score] |
| Back 9 | EVEN or [Player Ahead] [Leads/Wins(if decided)] [Press score] |
| Overall | EVEN or [Player Ahead] [Leads/Wins(if decided)] [Overall score] |

In an embodiment, the non-even results may be displayed from the leader/winner's perspective. In an example, for "Overall", the match tracking system 150 may display a "&" instead of a "/" (slash) to display scores as there are no presses [X holes up & Y to play]. In an example, the "&" may not be displayed if Overall match ends at 1 UP, 1 DN, 2 UP, 2 DN, or EVEN. In an embodiment, the user interface screen is scrollable to enable the information to be displayed at a reasonably-sized font. In one embodiment, the "Back 9" rows are left blank until the hole 10 score is entered and "Junk" rows may be left blank until a piece has been tallied.

In one embodiment, the match tracking system 150 is configured to determine "Hole 18 outcomes" which enables players to view potential match outcomes after 17 holes have been completed. This features determines in advance the various scenarios of how each match will wind up based on a win, loss, or tie of the last hole. The match tracking system 150 calculates the hole outcome in advance to simulate a win, loss, or tie of the final hole and makes the results available in the form of a tabular scorecard popup from the user's perspective.

In one embodiment, the match tracking system 150 is configured to enable an "Aloha" game feature. The match tracking system 150 provides and tracks the Aloha feature which offers players that are down in their matches the opportunity to recover up to half their guaranteed losses (or lose even more) with a 1-hole match on the last hole. As with any other match it ends in a win, loss, or tie. The match tracking system 150 determines the maximum Aloha value (if any) for each match and presents it to the user for selection.

An example process for providing and managing an Aloha game is as follows: 1) calculate max Aloha value for each match after hole 17 scores are entered; 2) activate Aloha button presenting popup detailing matches with respective max Aloha values; 3) capture user selected values for Max Aloha, No Aloha, or some value in between; and 4) add Aloha results to card after hole 18 scores are entered. According to an embodiment, a "Max Aloha" calculation includes the following steps: 1) determine who is ahead on hole 17 (if match is even no Aloha is possible); 2) determine outcome if player that is ahead loses 18; 3) calculate ½ that value rounded down to the nearest integer (if greater than 0 an Aloha is possible); and 4) incorporate captured Aloha values into Hole 18 Outcomes and match press score strings.

In one embodiment, the match tracking system 150 is configured to generate a match summary report. The match summary report provides a synopsis of the round and match outcomes. The match summary report may include a standard header section, dynamic match detail section, and standard scoring and reference sections. The match summary report corroborates, expands and recaps scorecard values. FIG. 8 illustrates an exemplary screenshot of a match summary report generated by a match management module, according to embodiments of the present disclosure.

In one embodiment, the match tracking system 150 is configured to generate a junk summary report. The junk summary report may provide a synopsis of exceptional scoring events. It includes a standard header section and details both automatic (scoring) related junk and manual (user inputted) junk. The junk summary report may give a detailed listing per player, hole, and junk.

Figure 9:
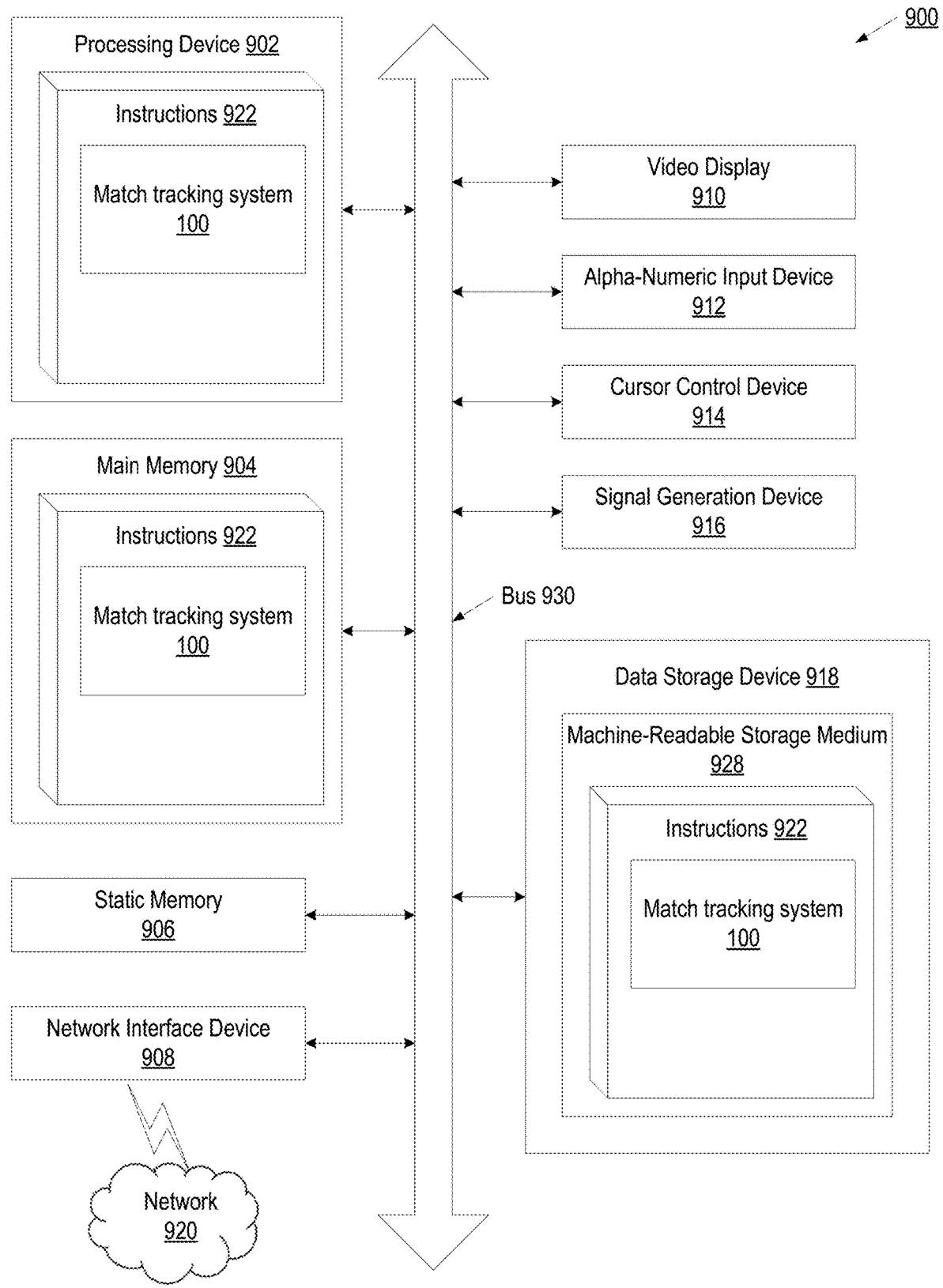
FIG. 9 is a block diagram of an example computer system for performing one or more of the operations described herein, according to embodiments of the present disclosure.

FIG. 9 is a block diagram of an example computer system that may perform one or more of the operations described herein, according to embodiments of the present disclosure. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processing device (e.g., a processor) 902, a main memory 904 (e.g., read-only memory (ROM), flash memory, dynamic random access memory (DRAM) such as synchronous DRAM (SDRAM), double data rate (DDR SDRAM), or DRAM (RDRAM), etc.), a static memory 906 (e.g., flash memory, static random access memory (SRAM), etc.), and a data storage device 914, which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 922 for performing the operations and steps discussed herein.

The computer system 900 may further include a network interface device 904. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 914 may include a computer-readable storage medium 924 on which is stored one or more sets of instructions 922 (e.g., software) embodying any one or more of the methodologies or functions described herein. The instructions 922 may also reside, completely or at least partially, within the main memory 904 and/or within the processor 902 during execution thereof by the computer system 900, the main memory 904 and the processor 902 also constituting computer-readable storage media. The instructions 922 may further be transmitted or received over a network 920 via the network interface device 908.

In one implementation, the instructions 922 include instructions for a match tracking system 100 and/or a software library containing instructions relating to the match tracking system 100. While the computer-readable storage medium 928 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "calculating", "determining", "generating", "identifying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

The terms "first", "second", "third", "fourth", etc. as used herein are meant as labels to distinguish among different elements and may not necessarily have an ordinal meaning according to their numerical designation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    customizing, by a processing device, a match based on match information in response to a first selection from a user device;
    configuring, by the processing device, a match profile associated with a plurality of players in response to a second selection received from the user device;
    retrieving, by the processing device, a golf handicap index associated with each of the plurality of players;
    calculating, by the processing device, a course handicap associated with each of the plurality of players based at least in part on the golf handicap index;
    allocating, by the processing device, a plurality of stroke holes for each of the plurality of players based on the course handicap; and
    generating, by the processing device, an electronic match scorecard comprising a plurality of scores associated with the plurality of players and the match information, wherein the electronic match scorecard is displayed within a first interface of the user device;
    generating, by the processing device, a slider for score entry;
    calculating, by the processing device, a plurality of scores and match statuses for a plurality of players based on match information in response to a selection received from a user device;
    optimizing, by the processing device, one or more values displayed via the slider in response to the plurality of scores and match statuses calculated for the plurality of players; and
    updating, by the processing device, the electronic match scorecard to comprise updated match scores.

2. The method of claim 1, wherein the match information comprises at least one of a plurality of golf game types, golf course information, or game stakes information.

3. The method of claim 1, further comprising:
    determining, by the processing device, a plurality of alternative player pairings; and
    generating, by the processing device, a plurality of scores and match statuses for the plurality of alternative player pairings.

4. The method of claim 1, wherein configuring the match profile associated with the plurality of players in response to the second selection received from the user device comprises retrieving the user information from a database comprising a list of contacts associated with the user.

5. The method of claim 1, further comprising:
    notifying, by the processing device, an additional user device associated with an additional player of match creation; and
    displaying, by the processing device, the electronic match scorecard via the additional user device associated with the additional player.

6. The method of claim 1, wherein the match information comprises one or more user-defined default values.

7. The method of claim 1, further comprising:
    displaying, by the processing device, an updated electronic match scorecard via an additional user device associated with an additional player.

8. The method of claim 1, wherein optimizing the one or more values displayed via the slider is based at least in part on a hole par value associated with each of the plurality of players.

9. The method of claim 1, further comprising:
    determining, by the processing device, a plurality of alternative player pairings; and
    generating, by the processing device, a plurality of scores and match statuses for the plurality alternative player pairings.

10. The method of claim 1, further comprising:
    generating, by the processing device, one or more match summary reports, wherein the one or more match summary reports display the one or more scores and match statuses.

11. A system comprising:
    a memory to store instructions; and
    a processing device operating coupled to the memory, the processing device to execute the instruction to:
        customize a match based on match information in response to a first selection from a user device;
        configure a match profile associated with a plurality of players in response to a second selection received from the user device;
        retrieve a golf handicap index associated with each of the plurality of players;
        calculate a course handicap associated with each of the plurality of players based at least in part on the golf handicap index;

allocate a plurality of stroke holes for each of the plurality of players based on the course handicap;

generate an electronic match scorecard comprising at least in part a plurality of scores associated with the plurality of players and the match information, wherein the electronic match scorecard is displayed within a first interface of the user device;

generate, by the processing device, a slider for score entry;

calculate, by the processing device, a plurality of scores and match statuses for a plurality of players based on match information in response to a selection received from a user device;

optimize, by the processing device, one or more values displayed via the slider in response to the plurality of scores and match statuses calculated for the plurality of players; and update, by the processing device, the electronic match scorecard to comprise updated match scores.

12. The system of claim 11, wherein the match information comprises at least one of a plurality of golf game types, golf course information, or game stakes associated with the match.

13. The system of claim 11, the processing device to:
determine a plurality of alternative player pairings; and
generate one or more scores and match statuses for the plurality of alternative player pairings.

14. The system of claim 13, wherein the match profile associated with a plurality of players is configured in response to the second selection received from the user device comprises retrieving the user information from a database comprising a list of contacts associated with the user.

15. The system of claim 11, the processing device to:
notify an additional user device associated with an additional player of match creation; and
display the electronic match scorecard via the additional user device associated with the additional player.

16. The system of claim 11, wherein the match information comprises user-defined default values.

17. A non-transitory computer-readable storage device storing computer-executable instructions that, if executed by a processing device, cause the processing device to:
customize a match based on match information in response to a first selection from a user device;
configure a match profile associated with a plurality of players in response to a second selection received from the user device;
retrieve a golf handicap index associated with each of the plurality of players;
calculate a course handicap associated with each of the plurality of players based at least in part on the golf handicap index;
allocate a plurality of stroke holes for each of the plurality of players based on the course handicap;
generate an electronic match scorecard comprising at least in part a plurality of scores associated with the plurality of players and the match information, wherein the electronic match scorecard is displayed within a first interface of the user device;
generate, by the processing device, a slider for score entry;
calculate, by the processing device, a plurality of scores and match statuses for a plurality of players based on match information in response to a selection received from a user device;
optimize, by the processing device, one or more values displayed via the slider in response to the plurality of scores and match statuses calculated for the plurality of players; and
update, by the processing device, the electronic match scorecard to comprise updated match scores.

18. The non-transitory computer-readable storage device of claim 17, wherein the match information comprises one or more user-defined default values.

19. The non-transitory computer-readable storage device of claim 17, the processing device to:
notify an additional user device associated with an additional player of match creation; and
display the electronic match scorecard via the additional user device associated with the additional player.

* * * * *